Figure 1:
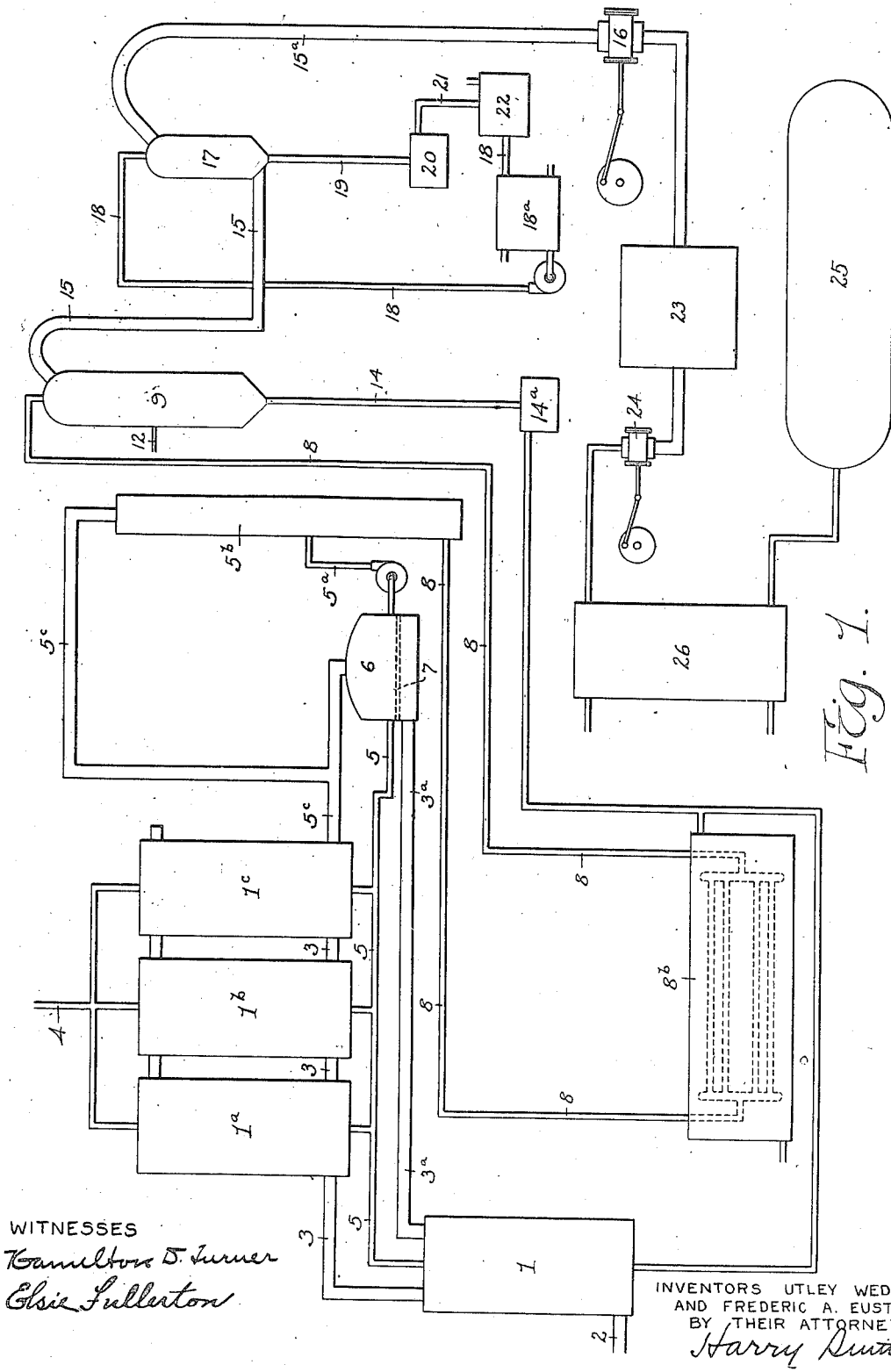

U. WEDGE & F. A. EUSTIS.
APPARATUS FOR SEGREGATING AND RECOVERING GASES.
APPLICATION FILED JULY 10, 1915.

1,260,493.

Patented Mar. 26, 1918.
2 SHEETS—SHEET 1.

WITNESSES

INVENTORS UTLEY WEDGE
AND FREDERIC A. EUSTIS
BY THEIR ATTORNEY

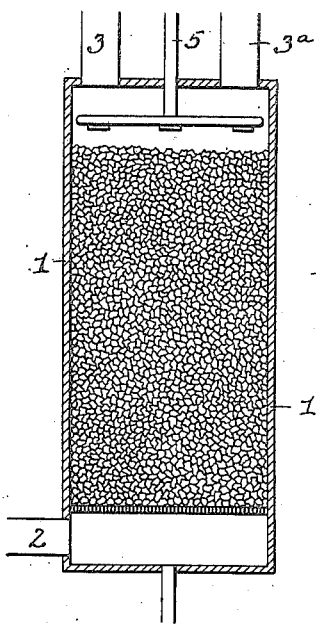
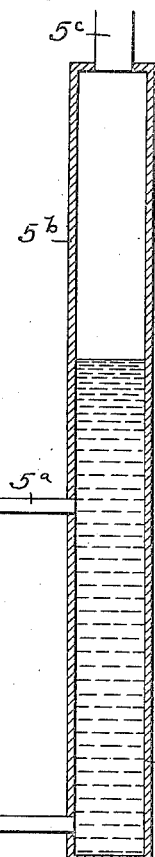
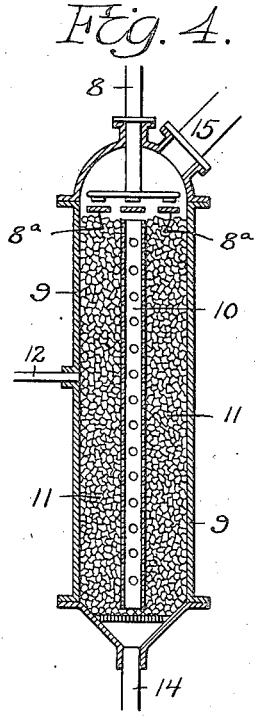
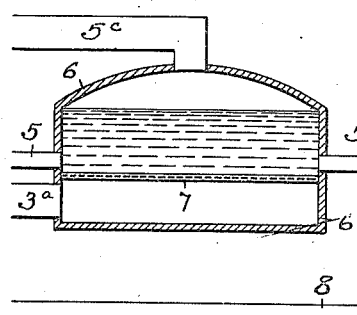
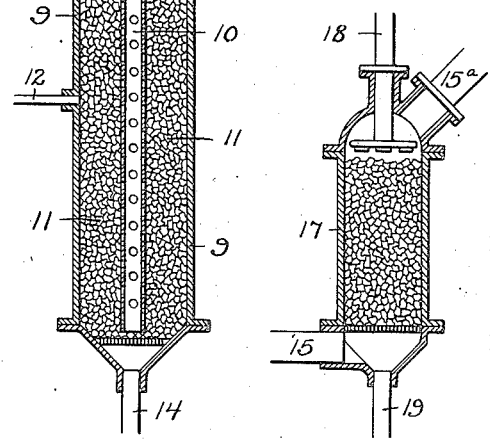
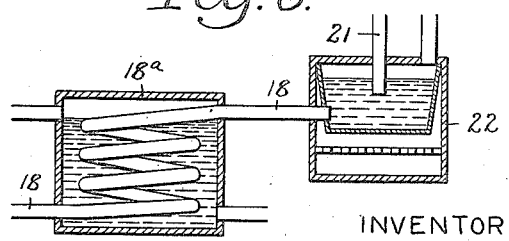
INVENTORS
UTLEY WEDGE
AND
FREDERIC A. EUSTIS
BY THEIR ATTORNEY

UNITED STATES PATENT OFFICE.

UTLEY WEDGE, OF ARDMORE, PENNSYLVANIA, AND FREDERIC A. EUSTIS, OF MILTON, MASSACHUSETTS.

APPARATUS FOR SEGREGATING AND RECOVERING GASES.

1,260,493.

Specification of Letters Patent.

Patented Mar. 26, 1918.

Application filed July 10, 1915. Serial No. 39,099.

*To all whom it may concern:*

Be it known that we, UTLEY WEDGE and FREDERIC A. EUSTIS, citizens of the United States, residing, respectively, in Ardmore, Pennsylvania, and Milton, Massachusetts, have invented certain Improvements in Apparatus for Segregating and Recovering Gases, of which the following is a specification.

Our invention consists of apparatus for conducting the method of segregating and recovering gases from others with which they may be associated which constitutes the subject of our application filed May 29, 1915, Serial No. 31,208. Referring in this specification to the process, we have regarded the same as intended for the recovery of $SO_2$ from furnace gases but this is simply a selected example as our process applies as well to the recovery of gases other than $SO_2$ and from gases other than furnace gases.

In the accompanying drawings—

Figure 1 represents, in diagrammatic form, apparatus in accordance with our invention, and Figs. 2 to 6, inclusive, are sectional views on a larger scale of different members of the apparatus.

Before proceeding to describe the apparatus constituting the subject of our present invention it will be well to give a brief description of the process as applied to the segregation and recovery of $SO_2$ from furnace gases, as this will conduce to a better understanding of the subsequent description of the apparatus.

Part of the furnace gases, previously cooled and enriched with $SO_2$, are brought into contact with liquid which will absorb $SO_2$. The enriching of the furnace gases is effected by bringing the initial supply thereof into contact with a portion of said liquid after it has absorbed $SO_2$. Part of the enriched gases are passed through the remaining portion of said liquid so as to cause the percentage of $SO_2$ therein to increase. The $SO_2$ is then driven off by subjecting the liquid to heat and vacuum, with or without agitation and, while still under vacuum, the $SO_2$ is deprived of any free liquid with which it may be associated, the dry gas being then compressed to the liquefying point and cooled, if such compression, liquefaction and cooling are found to be necessary.

In the drawings, 1, $1^a$, $1^b$, $1^c$, etc., represent a series of towers, tanks or like receptacles (hereinafter, for convenience, termed "towers") the tower 1 being packed with coke, slag, or other insoluble material in such form that liquid descending through the tower will present an extended superficial area for contact with the gases from the furnace. These gases enter the tower at or near the bottom of the same through a pipe 2 and escape at or near the top of the tower through a pipe 3 into the lower portions of the towers $1^a$, $1^b$, $1^c$, etc., of which any desired number may be employed, the pipe 3 thus supplying gases to each of these towers to which water or other liquid capable of absorbing $SO_2$ is admitted at the top through a pipe 4.

The towers $1^a$, $1^b$, $1^c$, etc., are packed either with coke or other insoluble material, or with limestone or other soluble material, which will increase the capacity of the liquid for absorbing $SO_2$, or the packing contained in these towers may be in part of such soluble material and in part of insoluble material.

The gases escaping from the upper portions of the towers $1^a$, $1^b$, $1^c$, etc., are discharged into the atmosphere or may be subjected to treatment for the recovery of other components of the same, if desired.

The liquid containing $SO_2$ escapes from the bottoms of the towers $1^a$, $1^b$, $1^c$, etc., into a pipe 5 and part of said liquid is conveyed through said pipe 5 into the upper portion of the tower 1 and is discharged onto the packing material therein through any suitable spreading or distributing device as shown in Fig. 2.

The remaining portion of the liquid containing $SO_2$ is delivered by the pipe 5 into a vessel 6 above the horizontal partition 7 therein and a portion of the enriched gases from the tower 1 are conveyed through a pipe $3^a$ into said vessel below said partition, which is composed of porous tile or other material of such character that upflow of gas through the same will be permitted but downflow of liquid through it will be prevented while such upflow of gas is maintained.

While such permeable partition is preferred it is not, however, necessary to the proper embodiment of our invention, as any other means available for the purpose of bringing the gas into contact with the liquid may be employed, if desired.

The furnace gases entering the lower portion of the tower 1 through the pipe 2 are normally at high temperature and consequently they will in rising through said tower heat the liquid containing $SO_2$ which is passing downwardly through the tower, with the twofold result that the rising gases will be cooled and the $SO_2$ will be driven from the liquid and returned to the furnace gases.

The gases escaping through the pipes 3 and $3^a$ will therefore be richer in $SO_2$ than the original furnace gases and will have had their temperature so reduced that they will not heat the liquid in the towers $1^a$, $1^b$, $1^c$, etc., and in the vessel 6 to such an extent as to prevent it from absorbing $SO_2$. The liquid entering the vessel 6 is somewhat enriched by the gas rising through the liquid, but is still only a dilute solution of gas.

Any free gas escaping from the liquid, may be returned from the vessel 6 to the towers $1^a$, $1^b$, $1^c$, etc., through a pipe $5^c$.

The liquid may be conveyed from the vessel 6 through a pipe $5^a$, and also through a pump, if desired, into a vessel $5^b$ wherein any free gas which may have accompanied it will be afforded an opportunity for escaping from the liquid and can be returned to the towers $1^a$, $1^b$, $1^c$, etc., through a pipe $5^d$.

A pipe 8 extends from the lower portion of the vessel $5^b$ to a heat exchanger $8^b$ and thence to the upper portion of a vacuum pan 9, the level of liquid in the vessel $5^b$ being preferably maintained at such a point that the vacuum or partial vacuum maintained in the pan 9 will be sufficient to cause flow of the liquid from said vessel $5^b$ to the pan 9. In the pan 9 the pipe 8 forms a distributer which discharges, preferably over spreaders $8^a$, into a mass of packing 11 contained in said pan 9 and surrounding a central perforated pipe 10 therein. A steam pipe 12 also communicates with the interior of the vacuum pan at any desired point and thus serves to heat the liquid descending through the packing 11.

$SO_2$ is therefore driven off from the liquid by reason of the heat imparted to it by the steam, the extraction being materially facilitated and a saving of heat effected by reason of the vacuum or partial vacuum maintained in the pan 9 and because of the agitation of the liquid and the large surface area of the same exposed in its passage through the packing 11, the central perforated pipe 10 providing for the escape of gas from all portions of said packing from top to bottom of the same.

The vacuum pan 9 has at the bottom a liquid discharge pipe 14 dipping at its lower end into a water seal $14^a$, this pipe being of such length that the column of liquid therein will discharge therefrom notwithstanding the vacuum or partial vacuum maintained in the pan 9.

The exhaust pipe 15 of the vacuum pan communicates with the lower portion of a vessel 17 whose upper portion communicates through a pipe $15^a$ with a vacuum pump 16, consequently a vacuum or partial vacuum is maintained in the vessel 17 as well as in the pan 9. The vessel 17 contains packing material of the same character as that in the vacuum pan or in the towers 1, $1^a$, $1^b$, $1^c$, etc., and the discharge pipe 19 leading from the lower portion of the vessel 17 dips into a liquid seal 20 similar to that employed in connection with the discharge pipe of the vacuum pan, said discharge pipe 19 being of such height that the discharge of liquid therefrom will be maintained notwithstanding the vacuum or partial vacuum maintained in the vessel.

From the liquid seal 20 at the lower end of the pipe 19 extends a pipe 21 which communicates with an evaporating pan 22, the latter having a discharge pipe 18 which passes through a cooler $18^a$ and communicates with the top of the vessel 17 and is preferably provided within said vessel with any suitable form of distributing device whereby sulfuric acid or other agent having an affinity for the liquid with which the $SO_2$ is associated, can be discharged onto the packing contained within the vessel 17, whereby the gas rising through said packing will be deprived of said liquid, the dry gas passing from the upper portion of the vessel through the pipe $15^a$ to the vacuum pump.

The diluted sulfuric acid or other agent passes from the vessel 17 to the evaporating pan 22, which is provided with any suitable means for heating it so as to drive off the water from the agent, the latter in its concentrated form returning to the vessel 17 to be again utilized. The water vapor is allowed to escape from the pan 22 through any suitable outlet.

The vacuum pump discharges the $SO_2$ into a suitable receiver 23 from which it may be withdrawn by means of a compression pump 24, the latter compressing the $SO_2$ to the point of liquefaction and discharging it into a storage tank 25 through an interposed cooler 26, if such compression, liquefaction and cooling are found to be necessary.

In addition to the heat economy effected by the use of the vacuum pan 9 further economy is effected by the use of the heat exchanger $8^b$ through which the liquid containing $SO_2$ passes on its way from the vessel $5^b$ to the vacuum pan. Said heat exchanger receives the heated liquid from the tower 1 and also the heated overflow from the water seal 14ª of the vacuum pan, consequently the liquid flowing through the casing of the exchanger is at a higher temperature than the liquid flowing through the circulating device therein on its way to the vacuum pan, and the latter liquid is thereby heated to such a degree as to reduce the amount of heat necessary to be added to it in the vacuum pan in order to insure the driving off of the $SO_2$ therefrom.

We claim:

1. The combination, in apparatus for segregating and recovering gases from other gases associated therewith, of means for subjecting the associated gases to contact with a liquid whereby the gas to be recovered will be segregated by absorption from the other gases, a vacuum pan, means for heating liquid therein means for conveying the liquid from the absorber to the vacuum pan, and means for conveying the gas therefrom under less than atmospheric pressure.

2. The combination, in apparatus for segregating and recovering gases from other gases associated therewith, of an absorber, means for conveying the associated gases to and through the same; means for causing flow of liquid through said absorber, in contact with said gases, a vacuum pan, means for heating liquid therein, and means for conveying the liquid from said absorber to said vacuum pan and means for conveying gas from said pan under less than atmospheric pressure.

3. The combination, in apparatus for segregating and recovering gases from other gases associated therewith, of a tower, means for conveying the associated gases to the lower portion thereof, means for causing a downward flow of liquid through the tower in contact with said gases, a vacuum pan, means for heating liquid therein and means for conveying the liquid from said tower to said vacuum pan and means for conveying gas from said pan under less than atmospheric pressure.

4. The combination, in apparatus for segregating and recovering gases from other gases associated therewith, of primary and secondary towers, means for conveying the associated gases successively through said primary and secondary towers, means for supplying liquid to said secondary tower, and causing it to contact with the gases in their passage through the same, a vacuum pan, means for conveying a portion of the liquid discharged from the secondary tower to the primary tower, and means for conveying another portion of said liquid to the vacuum pan.

5. The combination, in apparatus for segregating and recovering gases from other gases associated therewith, of primary and secondary towers, means for conveying the associated gases successively through said primary and secondary towers, means for supplying liquid to said secondary tower, and causing it to contact with the gases in their passage through the same, a vacuum pan, means for conveying a portion of the liquid discharged from the secondary tower to the primary tower, means for conveying another portion of said liquid to the vacuum pan, and means for imparting to the latter portion of said liquid in its passage heat derived from liquid from the primary tower.

6. The combination, in apparatus for segregating and recovering gases from other gases associated therewith, of primary and secondary towers, means for conveying the associated gases successively through said primary and secondary towers, means for supplying liquid to said secondary tower, and causing it to contact with the gases in their passage through the same, a vacuum pan, means for conveying a portion of the liquid discharged from the secondary tower to the primary tower, means for conveying another portion of said liquid to the vacuum pan, and means for imparting to said latter portion of said liquid on its way to the vacuum pan heat derived from liquid discharged from said vacuum pan.

7. The combination, in apparatus for segregating and recovering gases from other gases associated therewith, of primary and secondary towers, means for conveying the associated gases successively through said primary and secondary towers, means for supplying liquid to said secondary tower, and causing it to contact with the gases in their passage through the same, a vacuum pan, means for conveying a portion of the liquid discharged from the secondary tower to the primary tower, means for conveying another portion of said liquid to the vacuum pan, and means for imparting to said latter portion of said liquid on its way to the vacuum pan heat derived from liquid from said vacuum pan and from the primary tower.

8. The combination, in apparatus for segregating and recovering gases from other gases associated therewith, of primary and secondary towers, means for supplying gases to said towers, a vacuum pan, a gas absorbing vessel between said secondary tower and said vacuum pan, means for passing liquid in contact with the gases in said secondary tower, means for conveying liquid discharged from said secondary tower to the vacuum pan through the interposed gas absorbing vessel, and means for conveying gases from the primary tower through the liquid in its passage from the secondary tower to the vacuum pan.

9. The combination, in apparatus for segregating and recovering gases from other gases associated therewith, of primary and secondary towers, means for passing gases through said towers in succession, means for bringing liquid into contact with said gases in said secondary tower, a vacuum pan, means for conveying a portion of the liquid discharged from said secondary tower to the primary tower and another portion of said liquid to the vacuum pan, and means for conveying gases from the primary tower through the liquid in its passage from the secondary tower to the vacuum pan.

10. The combination, in apparatus for segregating and recovering gases under pressure from other gases associated therewith, of a tower, means for passing gases therethrough, means for passing liquid through said tower in contact with said gases, a vacuum pan, means for conveying liquid from said tower to said pan, a vacuum pump in connection with said vacuum pan, and a compression pump in communication with the discharge from said vacuum pump.

11. The combination, in apparatus for segregating and recovering gases from other gases associated therewith, of a tower, means for passing gases therethrough, means for bringing liquid into contact with said gases in their passage, a vacuum pan, means for conveying liquid from said tower to said vacuum pan, a vacuum pump, and means interposed between said vacuum pan and vacuum pump for removing liquid from the gas or gases flowing from the vacuum pan to the pump.

12. The combination, in apparatus for segregating and recovering gases in dry form from other gases associated therewith, of a tower, means for passing gases therethrough, means for bringing liquid into contact with said gases in their passage, a vacuum pan, means for conveying liquid from said tower to said vacuum pan, a vacuum pump, and means interposed between said vacuum pan and vacuum pump for removing liquid from the gas or gases flowing from the vacuum pan to the pump, said means comprising a supply of a liquid agent having an affinity for water, an evaporator, and means for conveying said agent from the evaporator to the drier, and, after its passage through the latter, from the drier to the evaporator.

13. The combination, in apparatus for segregating and recovering gases from other gases associated therewith, of a vacuum pan, means for heating liquid therein, means for supplying thereto liquid containing the gas to be recovered, means for causing said liquid to present an extended surface area in its passage through the pan, and means for conveying gas therefrom under less than atmospheric pressure.

14. The combination, in apparatus for segregating and recovering gases from other gases associated therewith, of a vacuum pan, means for heating liquid therein, means for supplying thereto liquid containing the gas to be recovered, means for breaking-up the flow of liquid in its passage through the pan, and means for conveying gas therefrom under less than atmospheric pressure.

15. The combination, in apparatus for segregating and recovering gases from other gases associated therewith, of a vacuum pan, means for supplying thereto liquid containing the gas to be recovered, means for heating the liquid in the pan, and means for conveying gas therefrom under less than atmospheric pressure.

16. The combination, in apparatus for segregating and recovering gases from other gases associated therewith, of a vacuum pan, means for supplying liquid thereto, a packing of porous material through which said liquid is caused to pass, and a discharge duct disposed within said packing.

17. The combination, in apparatus for segregating and recovering gases from other gases associated therewith, of a vacuum pan, means for supplying liquid thereto, a packing of porous material through which said liquid is caused to pass, and a discharge duct disposed centrally within said packing.

In testimony whereof, we have signed our names to this specification, in the presence of two subscribing witneses.

UTLEY WEDGE.
FREDERIC A. EUSTIS.

Witnesses to the signature of Utley Wedge:
   KATE A. BEADLE,
   HAMILTON D. TURNER.

Witnesses to the signature of Frederic A. Eustis:
   R. EMERSON,
   R. D. MALCOLM.